US012266486B2

(12) United States Patent
Yan et al.

(10) Patent No.: US 12,266,486 B2
(45) Date of Patent: Apr. 1, 2025

(54) BALANCE SPRING ASSEMBLY FOR DISCONNECTOR

(71) Applicant: HITACHI ENERGY LTD, Zürich (CH)

(72) Inventors: JiaQuan Yan, Guangzhou (CN); ShengQiang Li, Beijing (CN); ZhanGang Lv, Beijing (CN); WeiDong Zhang, Tianjin (CN)

(73) Assignee: HITACHI ENERGY LTD, Zürich (CH)

( * ) Notice: Subject to any disclaimer, the term of this patent is extended or adjusted under 35 U.S.C. 154(b) by 63 days.

(21) Appl. No.: 17/798,603

(22) PCT Filed: Feb. 12, 2020

(86) PCT No.: PCT/CN2020/074930

§ 371 (c)(1),
(2) Date: Aug. 10, 2022

(87) PCT Pub. No.: WO2021/159334

PCT Pub. Date: Aug. 19, 2021

(65) Prior Publication Data

US 2023/0154693 A1 May 18, 2023

(51) Int. Cl.
*H01H 3/30* (2006.01)
*H01H 3/38* (2006.01)

(52) U.S. Cl.
CPC ........ *H01H 3/3021* (2013.01); *H01H 3/3015* (2013.01); *H01H 3/38* (2013.01)

(58) Field of Classification Search
CPC .......... H01H 3/00; H01H 3/30; H01H 3/3026; H01H 3/32; H01H 3/3021; H01H 3/3015;
(Continued)

(56) References Cited

U.S. PATENT DOCUMENTS

2012/0199456 A1 8/2012 Tak et al.

FOREIGN PATENT DOCUMENTS

CN 1822275 A 8/2006
CN 203118805 U 8/2013
(Continued)

OTHER PUBLICATIONS

International Search Report and Written Opinion of the International Searching Authority, PCT/CN2020/074930, mailed Nov. 18, 2020, 9 pages.

(Continued)

*Primary Examiner* — Anthony R Jimenez
(74) *Attorney, Agent, or Firm* — Sage Patent Group

(57) ABSTRACT

A balance spring assembly for a disconnector comprises a push rod partially and coaxially arranged in a blade of the disconnector which is rotatable about a first shaft to change an operation status of the disconnector, a first end of the push rod fixed to a second shaft so that the push rod is rotatable about the second shaft; and a spring arranged in the blade and around the push rod, the spring held between a second end of the push rod and an end of the blade adjacent to the first shaft, wherein the second shaft is arranged parallel to the first shaft to enable the push rod to axially move in the blade with a rotation of the blade to thereby compress or decompress the spring. By arranging the balance spring assembly at least in part in the blade of the disconnector, only one set of the springs is needed.

20 Claims, 6 Drawing Sheets

(58) Field of Classification Search
CPC .. H01H 3/38; H01H 3/60; H01H 5/00; H01H 5/02; H01H 5/04; H01H 5/06; H01H 21/54; H01H 21/14; H01H 31/02; H01H 31/28
USPC .......................................................... 200/400
See application file for complete search history.

(56) References Cited

FOREIGN PATENT DOCUMENTS

| | | | |
|---|---|---|---|
| CN | 203536276 | U | 4/2014 |
| CN | 205508693 | U | 8/2016 |
| CN | 107017110 | A | 8/2017 |
| CN | 107706033 | A | 2/2018 |
| CN | 108511286 | A | 9/2018 |
| WO | 2013154824 | A1 | 10/2013 |

OTHER PUBLICATIONS

Chinese Office Action, Chinese Application No. 2020800961873, mailed Jul. 23, 2024, 3 pages.

BALANCE SPRING ASSEMBLY FOR DISCONNECTOR

CROSS REFERENCE TO RELATED APPLICATIONS

This application is a 35 U.S.C. § 371 national stage application of PCT International Application No. PCT/CN2020/074930 filed on Feb. 12, 2020, the disclosure and content of which is incorporated by reference herein in its entirety.

TECHNICAL FIELD

Embodiments of the present disclosure generally relate to a disconnector, and more specifically, to a balance spring assembly for the disconnector.

BACKGROUND

A disconnector is a type of switching device operated when current is not flowing through a power system. Both the open and closed operations of the disconnector are performed when the current is not flowing through the circuit. High voltage type isolation switches are utilized in substations for permitting isolation of equipment like transformers and circuit breakers. Typically, a disconnector switch is not used for circuit control, but it is for isolation. Disconnectors are activated either automatically or manually.

One type of disconnector is a vertical break disconnector. The vertical break disconnector typically comprises three poles, each of which usually comprises a frame, one rotating insulator and two support insulators on which a blade is mounted. The blade can be driven, for example, by a drive unit that rotates about its longitudinal axis, thereby closing a circuit on a fixed contact located on a side insulator.

Due to the mass of the blade, a large driving force is often required during the opening or closing process, which may have significant impact on the fixed contact. In order to reduce the driving force and the impact on the fixed contact, a balance spring assembly can be provided between the blade and a base on which the blade is mounted. In conventional solutions, a balance spring assembly typically comprises two sets of springs, and the blade is typically arranged between the springs. To protect the springs from erosion and to make sure the springs work, it is required to provide some additional components for each spring, for example, a protection tube, an auxiliary spring and some connection units. As a result, assembling the spring assembly is time consuming and inefficient. Furthermore, due to the location of the springs relative to the blade, the conventional balance spring assembly cannot fully perform its intended role.

SUMMARY

Embodiments of the present disclosure provide a balance spring assembly for a disconnector to at least in part solve the above and other potential problems.

In a first aspect, a balance spring assembly for a disconnector is provided. The balance spring assembly comprises a push rod partially and coaxially arranged in a blade of the disconnector which is rotatable about a first shaft to change an operation status of the disconnector, a first end of the push rod fixed to a second shaft so that the push rod is rotatable about the second shaft; and a spring arranged in the blade and around the push rod, the spring held between a second end of the push rod and an end of the blade adjacent to the first shaft, wherein the second shaft is arranged parallel to the first shaft to enable the push rod to axially move in the blade with a rotation of the blade to thereby compress or decompress the spring.

By arranging the balance spring assembly at least in part in the blade of the disconnector, only one set of the spring is needed. Furthermore, extra components such as the protective tube, the auxiliary spring and some connection elements are no longer needed. In this way, the manufacturing and assembling costs are significantly reduced. Furthermore, with this arrangement, the spring can fully work during the whole process when the blade is rotated from the open position to the close position.

In some embodiments, the balance spring assembly further comprises a holding block arranged at the second end of the push rod for holding one end of the spring. In this way, the compression force of the spring can be applied to surfaces, rather than points, thereby improving the reliability of the balance spring assembly.

In some embodiments, the balance spring assembly further comprises an insulation ring coaxially arranged around the holding block to provide insulation and guidance between the holding block and the blade. With this arrangement, the insulation ring can provide an electrical insulation between the blade and the balance spring assembly. Furthermore, the sliding of the holding block in the blade can be smoother.

In some embodiments, the balance spring assembly further comprises a flange arranged at the end of the blade adapted for holding one end of the spring. In this way, the spring can be well held between the holding block and the flange to further improve the reliability of the balance spring assembly.

In some embodiments, the flange comprises a through hole adapted for the push rod to pass through. This arrangement facilitates the assembly of the balance spring assembly.

In some embodiments, the blade is rotatable between an open position and a close position, wherein the blade is separated from a fixed contact of the disconnector at the open position to enable an open status of the disconnector, and the blade is connected to the fixed contact at the close position to enable a close status of the disconnector, and wherein the spring is compressed during the rotation of the blade from the open position to the close position. This arrangement ensures that the spring is being compressed throughout the process where the blade is rotated from open position to the close position.

In some embodiments, a distance between the first and second shafts in a direction perpendicular to the push rod in the close position exceeds a diameter of the push rod. In this way, the interference between the push rod and second shaft can be well avoided.

In some embodiments, the push rod is radially fixed on the second shaft such that a distance from the second end of the push rod to the second shaft is adjustable. In this way, the compression force of the spring can be adjustable to facilitate the maintenance of the balance spring assembly.

In some embodiments, the push rod comprises a threaded section adapted to be engaged with a threaded hole of the second shaft. The threaded section can facilitate the adjustment of the push rod relative to the first shaft.

In some embodiments, the balance spring assembly further comprises at least one stop element arranged on the threaded section and adjacent to the second shaft to prevent a radial movement of the push rod relative to the second shaft. This arrangement can prevent the push rod from radially moving relative to the first shaft, thereby improving the reliability of the balance spring assembly.

In a second aspect, a disconnector comprising the balance spring assembly as mentioned in the first aspect is provided.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through a more detailed depiction of example embodiments of the present disclosure in conjunction with the accompanying drawings, wherein in the example embodiments of the present disclosure, same reference numerals usually represent the same components.

Throughout the drawings, the same or similar reference symbols are used to indicate the same or similar elements.

DETAILED DESCRIPTION

Figure 1:
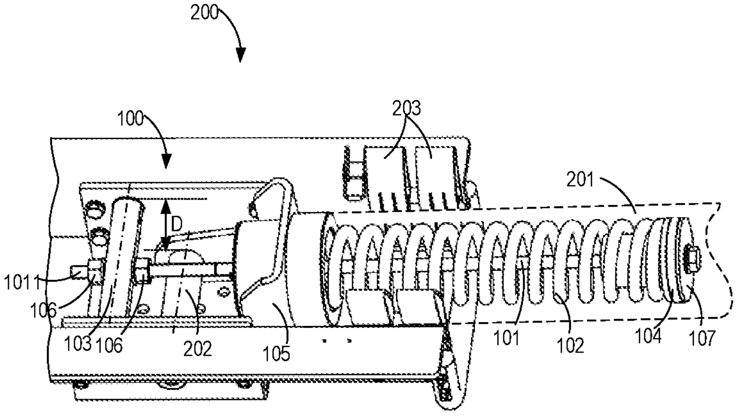
FIG. 1 shows a perspective view of a contact assembly and a balance spring assembly of a disconnector according to embodiments of the present disclosure, wherein the blade is hidden to show the components arranged therein.

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

As mentioned above, to reduce the force for driving a blade and the impact on a fixed contact of a disconnector, a balance spring assembly is typically provided between the blade and the base where the blade is mounted. In conventional solutions, the balance spring assembly typically comprises two sets of springs. The springs in the balance spring assembly are compressed during the rotation of the blade from an open position to a closed position. In this way, at least a part of the mass of the blade is transferred to and stored in the compressed spring to thereby reduce the impact of the blade on the fixed contact. During the rotation of the blade from the closed position to the open position, the compressed spring provides a restoring force to facilitate the rotation of the blade.

In conventional solutions, the balance spring assembly is mounted outside the blade. Because the disconnector is usually placed in an outdoor environment, in order to protect the spring from erosion, a plurality of components for enclosing the spring is necessary, for example, including: a protection tube and protection covers. Furthermore, to ensure the compressing and decompressing of the spring in the protection tube, an auxiliary spring and essential connection elements are also needed in the protection tube, that requires a complicated assembly process of the balance spring assembly.

In addition, two balance spring assemblies are provided for the blade in each pole. In this way, the blade is arranged between the two balance spring assemblies. This arrangement doubles the already large number of components, leading to increased cost and complexity.

Further, in conventional solutions, the push rod is usually arranged between the blade and the base via two pins located at two ends of the push rod. During the rotation of the blade, the pins are subjected to large forces. As a result, pins are easily deformed and damaged, resulting in a reduced reliability and additional maintenance costs.

Moreover, due to the location of the conventional balance spring assembly relative to the blade and the base, the spring usually only can function for a limited period of time during the rotation of the blade. For example, during the rotation of the blade from the open position to the closed position, the spring can barely be compressed before the blade is rotated past an intermediate position. After the blade is rotated past the intermediate position, the force of the blade cannot act on the spring any more, causing a rapid drop of the blade to the closed position.

Similarly, during the reverse rotation of the blade, i.e., from the closed position to the open position, the balance spring assembly also does not work prior to the intermediate position, causing an increased drive force of the drive unit.

In order to at least in part solve the above and/or other potential problems, embodiments of the present disclosure provide a balance spring assembly 100 for a disconnector 200.

FIG. 1 shows a perspective view of a contact assembly and a balance spring assembly 100 of a disconnector 200. As shown, the disconnector 200 comprises a contact assembly which includes a fixed contact 203. The blade 201 is rotatable about a shaft (referred to as a first shaft 202 for ease of discussion) to change an operation status of the disconnector 200.

Figure 2:
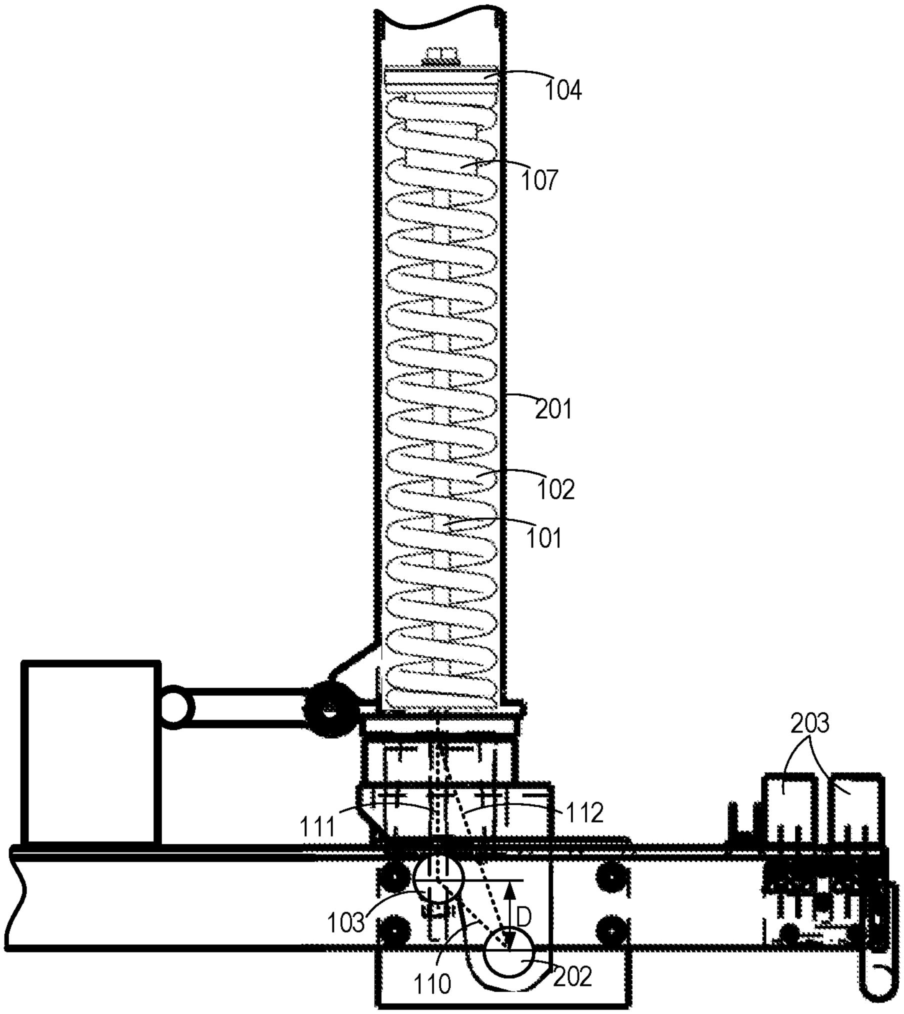
FIG. 2 shows a side sectional view of a contact assembly and a balance spring assembly of a disconnector according to embodiments of the present disclosure.

For example, the blade 201 is rotatable between an open position and a close position. At the open position, the blade 201 is separated from the fixed contact 203 to enable an open status of the disconnector 200, as shown in FIG. 2. In this way, the disconnector can permit isolation of equipment like transformers and circuit breakers in the power system. When the blade 201 is rotated from the open position to the close position, the blade 201 is connected to the fixed contact 203 to enable a close status of the disconnector 200, as shown in FIG. 1. As a result, the close status allows the circuit to be switched on.

As shown in FIG. 1, generally, the balance spring assembly 100 according to embodiments of the present disclosure comprises a push rod 101 and a spring 102. Different from the conventional solutions, the push rod 101 is partially and coaxially arranged in the blade 201 of the disconnector 200, as can be seen from FIGS. 1 and 2.

Furthermore, as shown, the spring 102 is also arranged in the blade 201 and around the push rod 101. One end (referred to as a first end for ease of discussion) of the push rod 101 is fixed to a second shaft 103 so that the push rod 101 is rotatable about the second shaft 103. The spring 102 is held between a second end of the push rod 101 which is opposite to the first end and an end of the blade 201 which is adjacent to the first shaft 202, as shown in FIG. 1.

The first and second shafts 202, 103 are parallel to each other. In this way, with a rotation of the blade 201, the spring 102 can be compressed or decompressed. To explain the principle of the present disclosure, a virtual triangle is introduced, as shown in FIG. 2. A first side 110 of the triangle is from the first shaft 202 to the second shaft 103, a second side 111 is from the second shaft 103 to the end of the blade 201 which is adjacent to the first shaft 202 and a third side 112 is from the first shaft 202 to the end of the blade 201 which is adjacent to the first shaft 202.

It is appreciated that lengths of the first side 110 and the third side 112 are constant. When the blade 201 is at the open position as shown in FIG. 2, an angle between the first and third sides 110, 112 is acute, causing a relative small length of the second side 111. When the blade 201 is rotated from the open position to the close position as shown in FIG. 1, the angle between the first and third sides 110, 112 becomes obtuse, resulting in a relative large length of the second side 111.

The length of the second side 111 is equal to a length of the push rod 101 out of the blade 201. That is, with the rotation of the blade 201 from the open position to the close position, the length of the push rod 101 out of the blade 201 becomes longer. In this way, the length of the push rod 101 in the blade becomes shorter when the blade 201 is rotated from the open position to the close position, causing the spring 102 arranged in the blade 201 to be compressed. The compressed spring 102 can absorb the potential energy released due to the weight of the blade 201 when the blade 201 rotates from the open position to the close position. As a result, the impact on the fixed contact 203 can be significantly reduced.

Specifically, it is to be appreciated that throughout the rotation of the blade 201 from the open position to the close position, the length of the push rod 101 in the blade 201 is reduced all the time. That is, the spring 102 is continuously compressed when the blade 201 is rotated from the open position to the close position to absorb the potential energy. In this way, the speed of blade 201 can be effectively controlled to reduce the impact on the fixed contact 203.

Similarly, during the rotation of the blade 201 from the close position to the open position, the fully compressed spring 102 is gradually restored all the time to provide an auxiliary force to facilitate the rotation of the blade 201. Accordingly, the driving force for driving the blade 201 can also be reduced.

In some embodiments, the spring 102 may be in a pre-compressed status when then blade 201 is at the open position, as shown in FIG. 2. This arrangement can improve the robustness of the balance spring assembly 100.

It can be seen from the above that by arranging the balance spring assembly 100 at least partially in the blade 201 of the disconnector 200, only one set of the spring is enough to reduce the force for driving the blade 201 and the impact on the fixed contact 203. Furthermore, extra components such as the protective tube, the auxiliary spring and some connection elements are no longer needed. In this way, the manufacturing and assembling costs of the disconnector 200 can be significantly reduced. Furthermore, with this arrangement, the spring 102 can work all the time when the blade 201 is rotated between the open position and the close position.

In some embodiments, the balance spring assembly 100 comprises a holding block 107 arranged at the second end of the push rod 101. In this way, one end of the spring 102 can be held on the holding block 107. Furthermore, in some embodiments, the balance spring assembly 100 may also comprise a flange 105 arranged at the end of the blade 201 adjacent to the first shaft 202. Another end of the spring 102 can be held on the flange 105.

Figure 3:
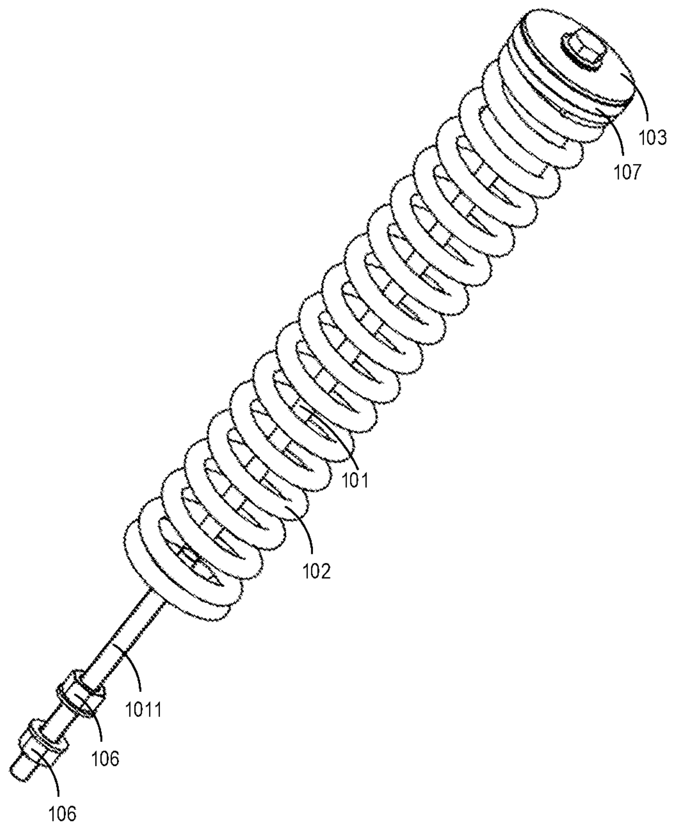
FIG. 3 shows a perspective view of a push rod and a spring according to embodiments of the present disclosure.
Figure 4:
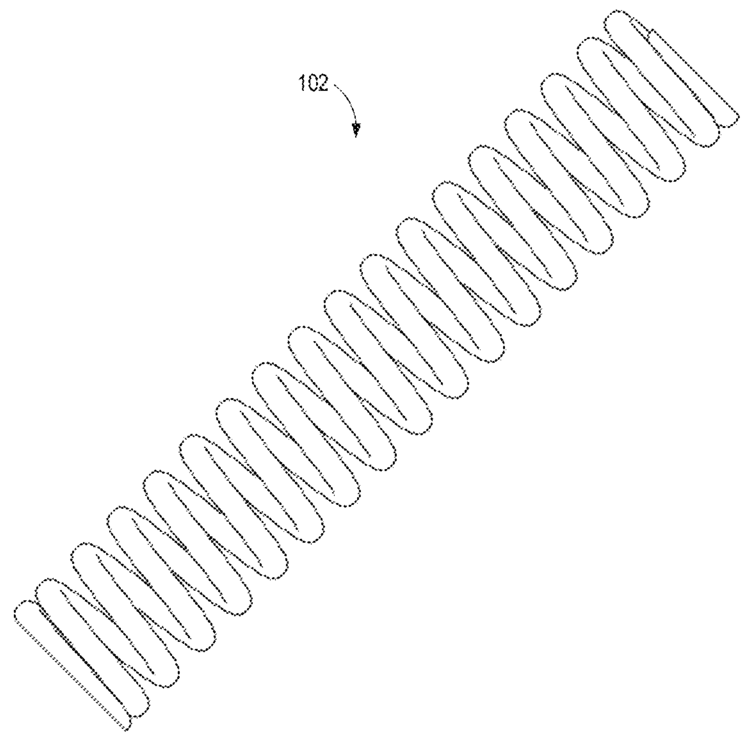
FIG. 4 shows a side view of a spring according to embodiments of the present disclosure.
Figure 5:
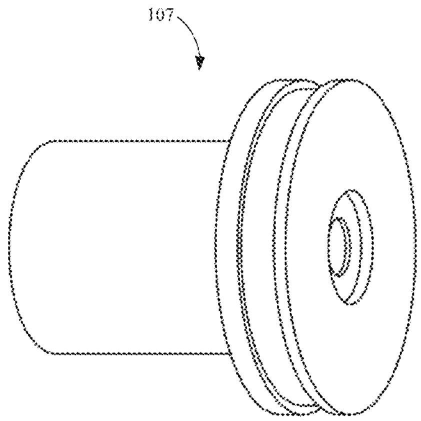
FIG. 5 shows a perspective view of an insulation block according to embodiments of the present disclosure.
Figure 6:
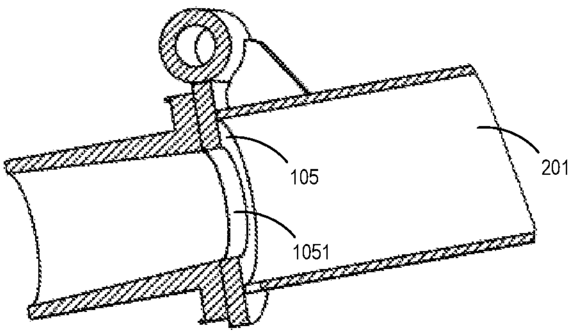
FIG. 6 shows a sectional view of a flange according to embodiments of the present disclosure.

As can be seen from FIGS. 3 and 4, end surfaces of the spring 102 are of flat shapes, which are in contact with surfaces of the flange 105 and the holding block 107, respectively. In this way, the spring 102 can be held between the flange 105 and the holding block 107, as shown in FIGS. 5 and 6. As a result, compared to the conventional solutions, the compression force of the spring 102 is applied to surfaces, rather than points, thereby reducing the risk of damage to the stressed parts. In this way, the reliability of the balance spring assembly 100 can be improved.

In some embodiments, the holding block 107 may be fixed to the second end of the push rod 101 by a screw or any other suitable fastening means. For example, in some alternative embodiments, the holding block 107 may also be fixed to the push rod 101 by welding, a snap connection, or the like.

Furthermore, an insulation ring 104 may be provided to be coaxially arranged around the holding block 107. For example, as shown in FIG. 5, the insulation ring 104 may be arranged in a ring-shaped groove formed on an outer surface of the holding block 107. In this way, the insulation ring 104 is arranged between an inner surface of the blade 201 and the outer surface of the holding block 107. On the one hand, the insulation ring 104 can provide an electrical insulation between the blade 201 and the push rod 101. On the other hand, the insulation ring 104 can eliminate the shaking of the holding block 107 due to the gap between the holding block 107 and the blade, thereby to smooth the sliding of the holding block 107 in the blade 201.

To facilitate the push rod 101 passing through the flange 105, in some embodiments, a through hole 1051 may be provided on the flange 105. This arrangement facilitates the assembly of the balance spring assembly 100.

Referring back to FIGS. 1 and 2, in some embodiments, to avoid interference between the push rod 101 and the first 202, a distance D between the first and second shafts 202, 103 in a direction perpendicularly to the push rod 101 in the close position may exceed a diameter of the push rod 101. "Exceed" means that the distance D is equal to or larger than the diameter of the push rod 101. In this way, the push rod 101 can be rotated to the close position without interference with the first shaft 202.

In some embodiments, the push rod 101 may be radially fixed on the second shaft 103 such that a distance from the second end of the push rod 101 to the second shaft 103 can be adjusted. For example, a user can adjust the distance from the second end of the push rod 101 to the second shaft 103 to adjust the pre-compression force of the spring 102. Furthermore, this arrangement can also facilitate the replacement of springs with different lengths. In this way, the maintenance of the balance spring assembly 100 can be facilitated.

Figure 7:
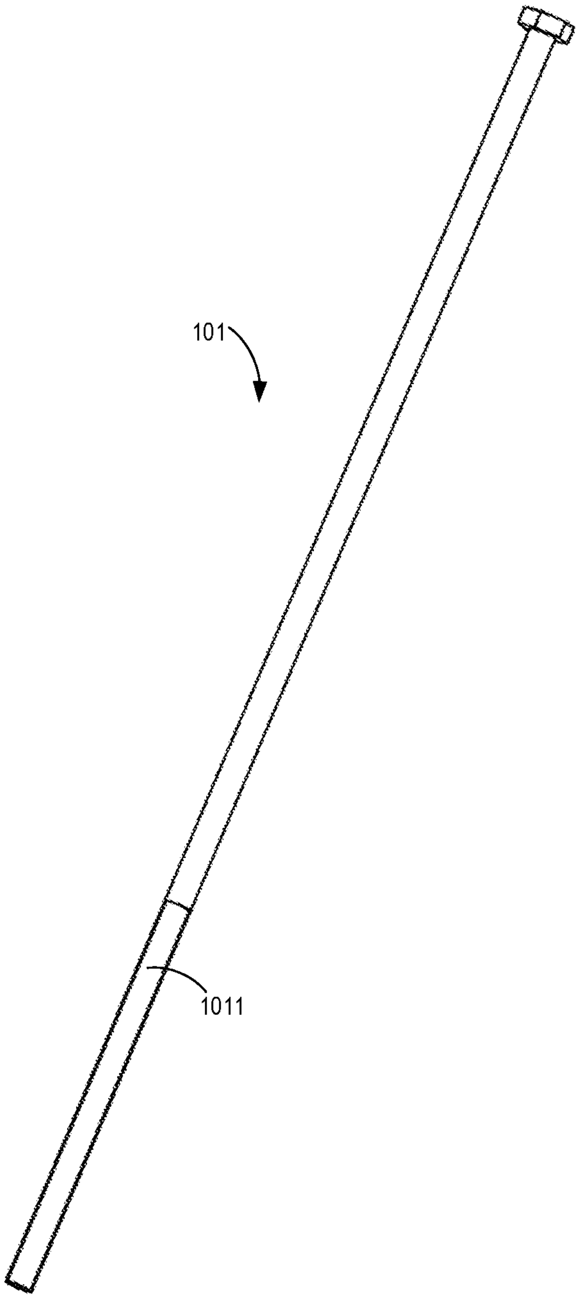
FIG. 7 shows a side view of a push rod according to embodiments of the present disclosure.

To allow the adjustable distance from the second end of the push rod 101 to the second shaft 103, in some embodiments, the push rod 101 may comprise a threaded section 1011, as shown in FIG. 7. Furthermore, a threaded hole may also be radially provided in the second shaft 103. In this way, the threaded section 1011 can be engaged with the threaded hole to allow the distance from the second end of the push rod 101 to the second shaft 103 to be adjusted.

In some embodiments, to avoid unwanted movement of the push rod 101 relative to the second shaft 103, at least one stop element 106 may be arranged on the threaded section 1011. As can be seen from FIG. 1, in some embodiments, there are two stop elements 106 adjacent to the second shaft 103. In this way, when the distance from the second end of the push rod 101 to the second shaft 103 is well adjusted, the movement of the push rod 101 relative to the second shaft 103 can be prevented.

Embodiments of the present disclosure further provide a disconnector comprising a balance spring assembly 100 as mentioned above. With the balance spring assembly 100, the reliability of the disconnector can be improved while reducing the costs of the disconnector.

It should be appreciated that the above detailed embodiments of the present disclosure are only to exemplify or explain principles of the present disclosure and not to limit the present disclosure. Therefore, any modifications, equivalent alternatives and improvements, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A balance spring assembly for a disconnector, comprising:

a push rod partially and coaxially arranged in a blade of the disconnector, wherein the blade is rotatable about a first shaft to change an operation status of the disconnector, a first end of the push rod fixed to a second shaft so that the push rod is rotatable about the second shaft; and a spring arranged in the blade and around the push rod, the spring held between a second end of the push rod and an end of the blade adjacent to the first shaft, wherein the second shaft is arranged parallel to the first shaft to enable the push rod to axially move in the blade with a rotation of the blade to thereby compress or decompress the spring.

2. The balance spring assembly of claim 1, further comprising a holding block arranged at the second end of the push rod for holding one end of the spring.

3. The balance spring assembly of claim 2, further comprising:

an insulation ring coaxially arranged around the holding block to provide insulation and guidance between the holding block and the blade.

4. The balance spring assembly of claim 2, further comprising:

a flange arranged at the end of the blade for holding one end of the spring.

5. The balance spring assembly of claim 4, wherein the flange comprises a through hole adapted for the push rod to pass through.

6. The balance spring assembly of claim 1, wherein the blade is rotatable between an open position and a close position, wherein the blade is separated from a fixed contact of the disconnector at the open position to enable an open status of the disconnector, and the blade is connected to the fixed contact at the close position to enable a close status of the disconnector, and wherein the spring is compressed during the rotation of the blade from the open position to the close position.

7. The balance spring assembly of claim 6, wherein a distance (D) between the first shaft and the second shaft in a direction perpendicular to the push rod in the close position exceeds a diameter of the push rod.

8. The balance spring assembly of claim 1, wherein the push rod is radially fixed on the second shaft such that a distance from the second end of the push rod to the second shaft is adjustable.

9. The balance spring assembly of claim 8, wherein the push rod comprises a threaded section adapted to be engaged with a threaded hole of the second shaft.

10. The balance spring assembly of claim 9, further comprising:

at least one stop element arranged on the threaded section and adjacent to the second shaft to prevent a radial movement of the push rod relative to the second shaft.

11. A disconnector comprising:

a contact assembly comprising a fixed contact; and a balance spring assembly comprising:

a push rod partially and coaxially arranged in a blade of the disconnector, wherein the blade is rotatable about a first shaft to change an operation status of the disconnector, a first end of the push rod fixed to a second shaft so that the push rod is rotatable about the second shaft; and a spring arranged in the blade and around the push rod, the spring held between a second end of the push rod and an end of the blade adjacent to the first shaft, wherein the second shaft is arranged parallel to the first shaft to enable the push rod to axially move in the blade with a rotation of the blade to thereby compress or decompress the spring.

12. The disconnector of claim 11, the balance spring assembly further comprising a holding block arranged at the second end of the push rod for holding one end of the spring.

13. The disconnector of claim 12, further comprising:

an insulation ring coaxially arranged around the holding block to provide insulation and guidance between the holding block and the blade.

14. The disconnector of claim 12, the balance spring assembly further comprising:

a flange arranged at the end of the blade for holding one end of the spring.

15. The disconnector of claim 14, wherein the flange comprises a through hole adapted for the push rod to pass through.

16. The disconnector of claim 11, wherein the blade is rotatable between an open position and a close position, wherein the blade is separated from the fixed contact at the open position to enable an open status of the disconnector, and the blade is connected to the fixed contact at the close position to enable a close status of the disconnector, and wherein the spring is compressed during the rotation of the blade from the open position to the close position.

17. The disconnector of claim 16, wherein a distance (D) between the first shaft and the second shaft in a direction perpendicular to the push rod in the close position exceeds a diameter of the push rod.

18. The disconnector of claim 11, wherein the push rod is radially fixed on the second shaft such that a distance from the second end of the push rod to the second shaft is adjustable.

19. The disconnector of claim 18, wherein the push rod comprises a threaded section adapted to be engaged with a threaded hole of the second shaft.

20. The disconnector of claim 19, the balance spring assembly further comprising:

at least one stop element arranged on the threaded section and adjacent to the second shaft to prevent a radial movement of the push rod relative to the second shaft.

* * * * *